E. Lampman,
Center Table.

N° 60,525.  Patented Dec. 18, 1866.

Witnesses
A. A. Yeatman
Charles Alexander

Inventor
Edwin Lampman
per
Alexander & Mason
Atty.

United States Patent Office.

IMPROVED CENTRE-TABLE.

EDWIN LAMPMAN, OF CATSKILL, NEW YORK.

Letters Patent No. 60,525, dated December 18, 1866.

The Schedule referred to in these Letters Patent and making part of the same.

TO ALL WHOM IT MAY CONCERN:

Be it known that I, EDWIN LAMPMAN, of Catskill, in the county of Greene, and State of New York, have invented certain new and useful improvements in Centre-Tables; and I do hereby declare that the following is a full, clear, and exact description of the same, reference being had to the accompanying drawings, and to the letters of reference marked thereon.

Figure 1:
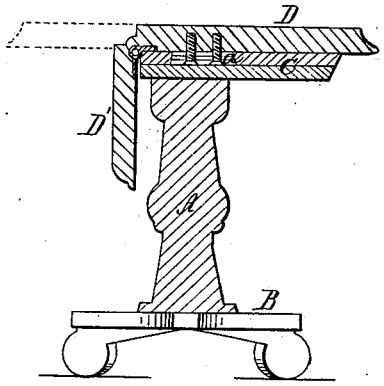
Figure 2:
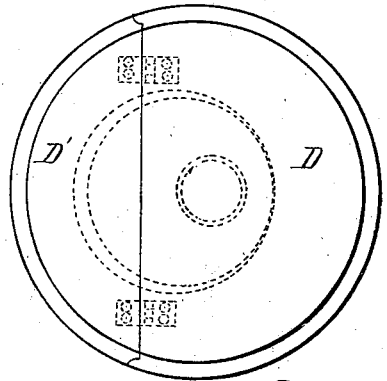

In the annexed drawings, making part of this specification, A represents the leg of the table, which rests upon the ordinary triangular base, B, to which casters may be attached if desired; C represents a wooden or metallic disk, which is composed of two parts, as shown in fig. 1, and which is permanently secured to the top of the leg, A; $a$ represents a conical plug or pin, which, after passing through a conical hole, in which it is made to fit in the upper part of the disk C, is securely attached to the under side of that portion of the table-top marked D. The leg, H, is secured eccentrically to the disk, C, as shown. D' represents a leaf of the table-top, D, and is hinged to it in the usual manner. By revolving the table-top partially in one direction, the leaf, D', is supported by means of the disk, C, as seen in fig. 2; the position of the disk being shown in red lines. By revolving the said top partially in the opposite direction again, the disk, C, passes from under the leaf, D', and said leaf is thus allowed to turn down upon its hinge. This arrangement of parts gives a centre-table with a leaf which can be raised or lowered without any apparent mechanism for that purpose, and one which is not liable to get out of order, and which can be constructed very cheaply.

Having thus fully described my invention, what I claim as new, and desire to secure by Letters Patent, is—

The arrangement of the disk C, as constructed with the leg A, pin or plug $a$, and top D, as and for the purpose herein set forth.

As evidence that I claim the foregoing, I have hereunto set my hand in the presence of two witnesses.

EDWIN LAMPMAN.

Witnesses:
EDGAR RUSSELL,
GEORGE BENCH.